United States Patent [19]
Murphy

[11] 3,897,334
[45] July 29, 1975

[54] SINGLE BASIN AERATED SEWAGE LAGOON WITH SPRING TIME INTENSIFIED AERATION

[75] Inventor: Declan S. Murphy, Montreal, Canada

[73] Assignee: Atara Corporation, Montreal, Canada

[22] Filed: Mar. 14, 1972

[21] Appl. No.: 234,618

Related U.S. Application Data

[62] Division of Ser. No. 64,508, Aug. 17, 1970, abandoned.

[52] U.S. Cl. ................................. 210/15; 210/199
[51] Int. Cl. ............................................ C02c 1/02
[58] Field of Search ....... 210/170, 199, 15, 12, 138, 210/139, 149; 261/124

[56] References Cited
UNITED STATES PATENTS

| 2,212,841 | 8/1940 | Maxwell | 210/199 X |
| 3,169,921 | 2/1965 | Griffith | 210/170 |
| 3,234,123 | 2/1966 | Hinde | 261/124 X |
| 3,505,213 | 4/1970 | Anthony et al. | 210/170 X |
| 3,525,685 | 8/1970 | Edwards | 210/199 X |
| 3,671,022 | 6/1972 | Laird et al. | 210/170 X |
| 3,714,036 | 1/1973 | Slater | 210/8 |

Primary Examiner—Thomas G. Wyse
Attorney, Agent, or Firm—Stevens, Davis, Miller & Mosher

[57] ABSTRACT

An aerated sewage lagoon has aerators disposed densely near the inflow, then gradually less densely proceeding towards the outflow and then densely disposed again and finally an area of no aeration. The aerators can be shut off so that in spring there is a second high intensity area to cope with the suddenly increased demand due to winter dormancy; and in summer the high intensity aeration is followed by an area over which the aeration continues but at gradually reduced intensity as the sewage moves downstream to the outflow. In winter aerators nearer the outflow can be shut off entirely.

2 Claims, 5 Drawing Figures

SINGLE BASIN AERATED SEWAGE LAGOON WITH SPRING TIME INTENSIFIED AERATION

This application is a division of my parent application Ser. No. 64,508 filed Aug. 17, 1970, now abandoned.

This invention relates to aerated sewage lagoons; in these, compressed gas, which is usually air, but could be oxygen enriched is passed upwardly through the liquid to aerobically decompose it.

Previous designs of lagoons have generally spaced aerators evenly over the basin, or the floor, of the lagoon with perhaps a greater concentration at the inlet where the sewage is most raw and the oxygen demand could be expected to be greatest.

It is known, as a general principle that chemical reactions, including biochemical action, proceed faster with increased temperature; but the normal application of this principle as applied to artificial sewage treatment lagoons gives results that are highly unsatisfactory when the temperature is below maximum but has just increased rapidly. The effect of this is that effluent quality deteriorates markedly in late spring of each year; and aeration capacity has been wasted.

It is, therefore, one object of this invention to minimize capital expenditure in the form of a compressor plant.

It is a further object of this invention to provide a method of adjustable control by differential operation of aeration so as to maintain effluent purity above a predetermined level at all times.

It is another object of this invention to provide a method for operating a sewage lagoon efficiently.

It is another object of this invention to provide an unobvious method of oxygenating sewage to enable the oxygen demand (required to maintain effluent quality) to be met as it arises.

The invention may be more easily understood by reference to the following drawings which show by way of example one arrangement for achieving the above objects.

Figure 1:
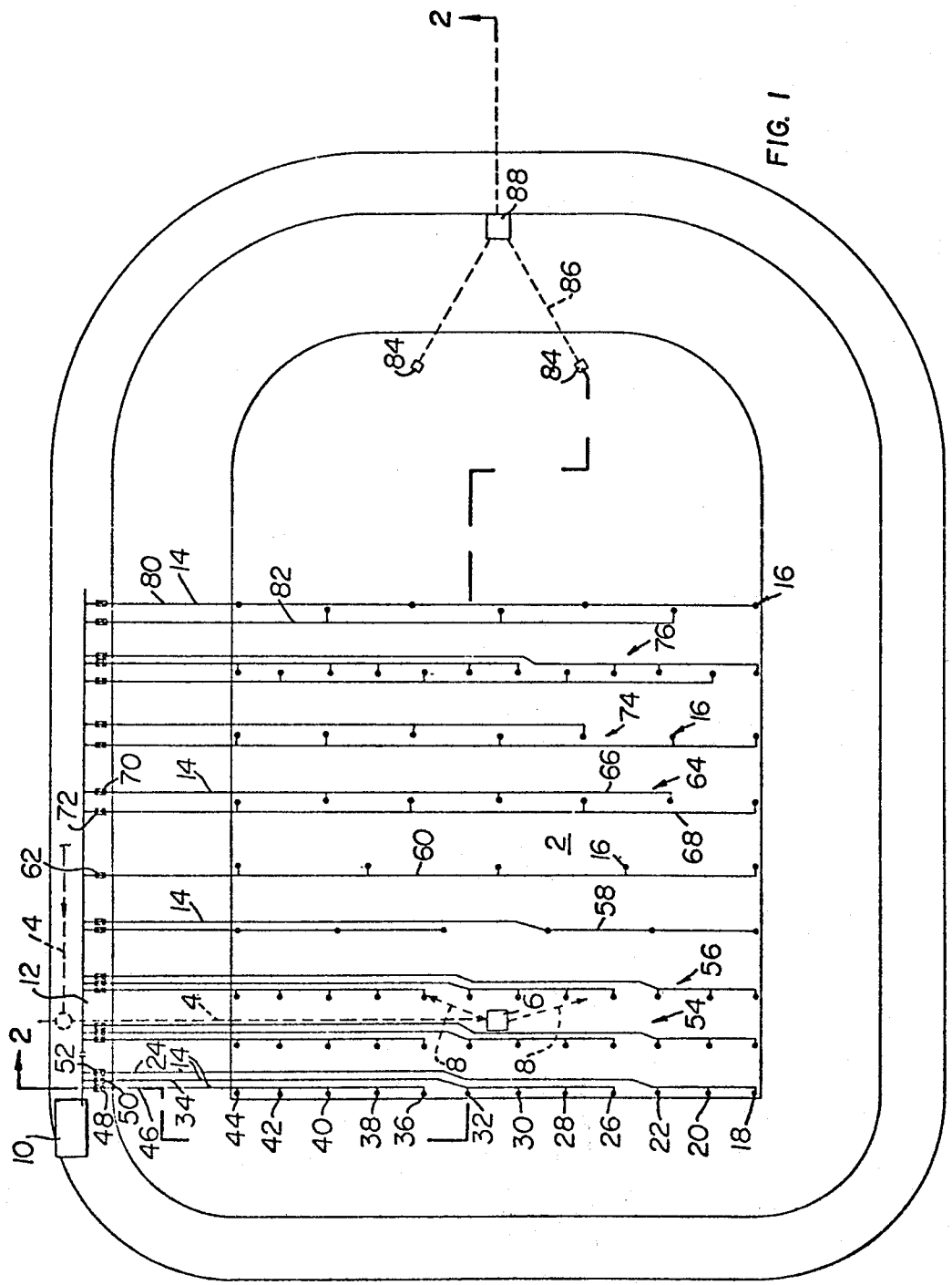
FIG. 1 shows a layout in plan view of a lagoon illustrating one way in which the aerating devices may be distributed so as to allow the objects of the invention to be met.
Figure 2:
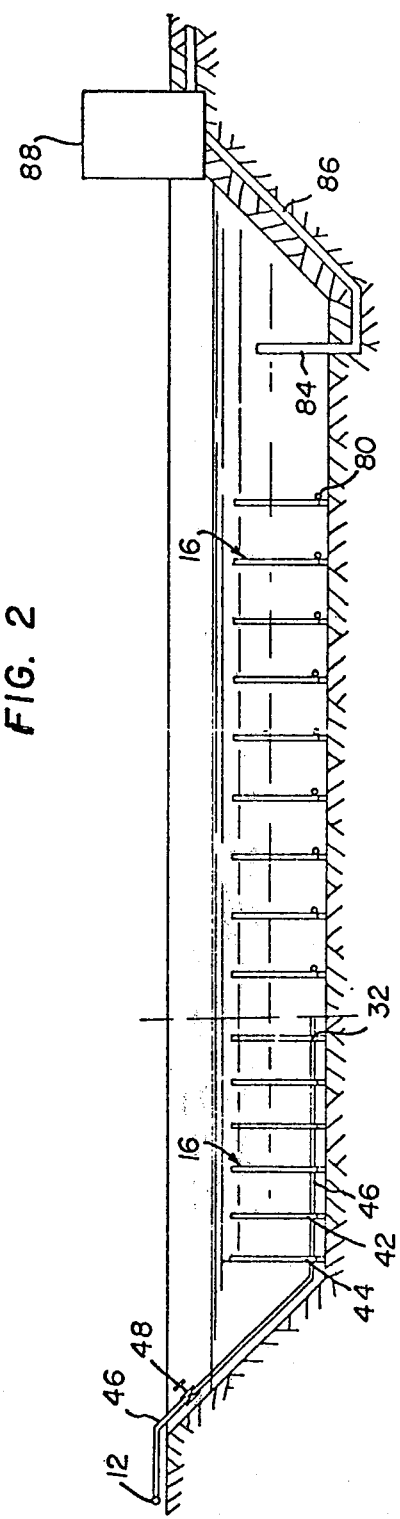
FIG. 2 is a sectional view of FIG. 1 through the line 2—2.

In the drawings a lagoon basin 2 which may typically have floor dimensions of 350 feet by 250 feet is fed with influent sewage through a pipe 4 leading from a main sewer. The inlet 6 to the basin from the pipe 4 is directed generally towards the head of the basin as shown by arrows 8.

Air is supplied into the lagoon by means of compressors or blowers by which 1 include fans or the like which will produce large volumes of air at relatively low gauge pressures of, say, 1 atmosphere or so. These compressors are housed in compressor house 10 and feed, through a main air header 12, by way of distribution lines 14, a multitude of aeration devices which are generally indicated as 16 although specific guns may carry further designation below to explain certain features of the lagoon.

These aeration devices may take one of many forms. I prefer to use the type described in Canadian Pat. No. 746,669, also known in the trade as the "burp-gun" type; these guns are about eight feet tall and the average liquid depth is 15 feet. However, other aeration devices, such as a simple nozzle with a shroud or deflector to assist mixing of air and water may be used. Whatever type is used, it will be obvious to those skilled in the art that the aeration effect at each should be made uniform, or approximately so across the lagoon. Hence, I couple the three specified aeration guns 18, 20 22 which are furthest from the header 12 to one 1½ inch diameter distribution line 24, the four next guns 26, 28, 30 and 32 to 1½ inch distribution line 34 and the five guns closest to the line 36, 38, 40, 42 and 44 to line 46. The three 2 inch globe valves 48, 50 and 52 are ganged together for simultaneous operations so that a row of high intensity aeration is provided.

Figure 3:
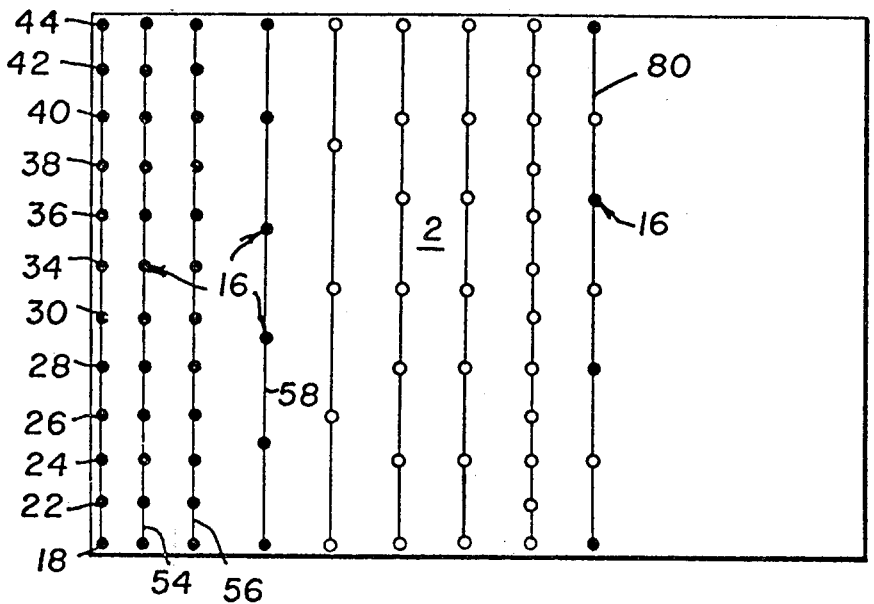
FIGS. 3, 4 and 5 are diagrammatic plan views showing those of the aerating devices which are activated during "winter," "spring" and "summer" operation respectively. The meaning of these terms will be described later, because they have a connotation of temperature scale values rather than seasonal temperature variations.
Figure 4:
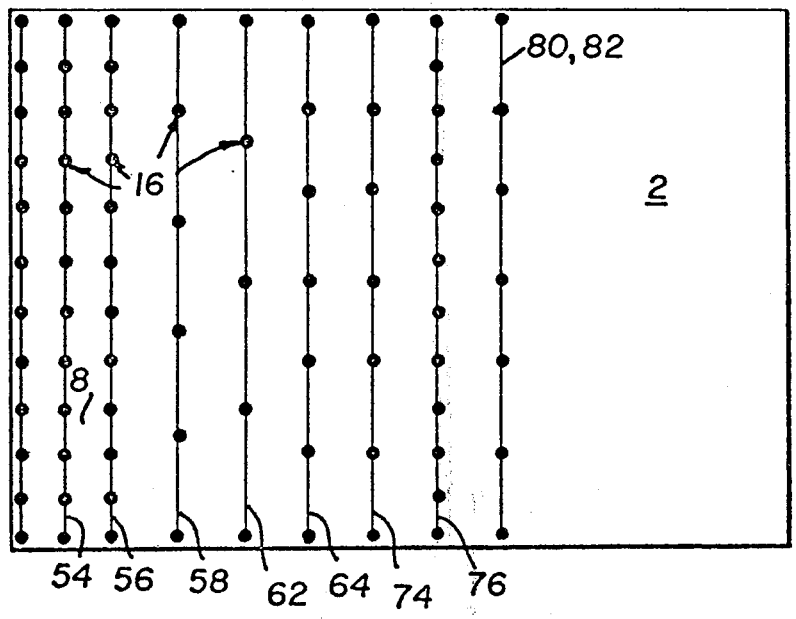
Figure 5:
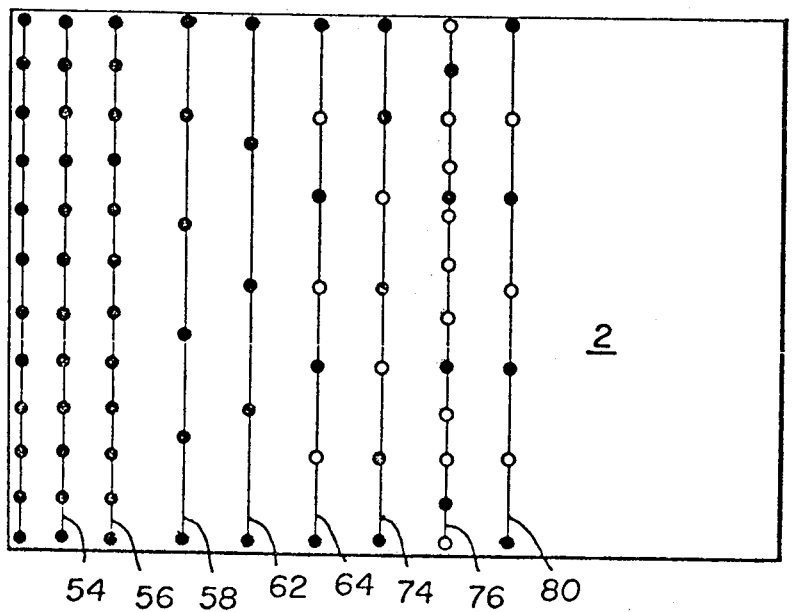

The next two rows 54, 56 of aerators are operated in identical fashion and all nine globe valves may be ganged together. The fourth row 58 has only six aerators fed by two lines, but apart from this the operation is similar; as may be seen from the operating diagram of FIGS. 3, 4 and 5 these globe valves may also be operated in conjunction with those of the first three rows. These are open all the year round and are closed only if the lagoon is not being used; they represent a high intensity aeration means adjacent the inflow.

On the other hand, the aerators in fifth row, 60 are fed with air only in "spring" and "summer;" that is, globe valve 62 is shut in "winter." The sixth row 64 is supplied by two lines 66, 68 with three and four aerators respectively disposed evenly along each. One of these lines is fed in "summer" and both are fed in "spring;" thus, in spring there are seven active aerators in this row as both globe valves 70, 72 are open but in summer globe valve 70 is shut to leave only four aerators active.

The seventh and eighth rows 74, 76 are similar in operation to the sixth row both being in full operation in "spring" with seven and 12 aerators respectively, and in partial operation in "summer" with five and four aerators operating. The globe valve operation for the two lines of row 74 and the three lines of row 76 will be obvious. It will also be seen that row 76 represents, when operating under "spring" conditions, a second means for high intensity aeration and although the line layout is different the aeration capacity is as much as that of the first three rows.

The ninth and last row 78 has four aerators in one line 80 operating all the year round and three aerators in line 82 which are brought into operation in "spring." Thus, if a count is made it will be seen that in "winter" operation a total of 46 guns are in operation; this rises to 80 in "spring" and falls to 64 in "summer." It is this 64 gun operational capacity that I term the aeration rate to maintain complete decomposition at a steady state lagoon liquid temperature of 20°C.

These terms, "winter," "spring" and "summer" correspond in the Montreal - Ottawa district and similar climate to the periods mid-November to mid-May, mid-May to mid-July and mid-July to mid-November respectively. In point of fact, they relate to lagoon temperatures of "cold," "increasing to warm" and "warm;" "cold" is below 10°C, "increasing to warm"

is between 10°C and 15°–18°C and is also somewhat time dependent; and "warm" is 20°C. and above. The influence of ambient air and sunshine, of course, are the main factors affecting this as the influent temperature varies much less than ambient and the liquid flows into the lagoon quite slowly relative to the volume already there; a typical transit time for liquid is about 15 to 20 days.

When I do not wish to be bound by the following explanation I consider that what happens when the temperature drops below about 10°C. a proportion of aerobic bacterial activity ceases and undecomposed organic material of high molecular weight is deposited as a sludge. This material is, of course, bacteriologically degradable waste and is not to be confused with non-decomposables such as plastic fragments, woven textile fibres and the like which also form sludge. Hence, throughout the "cold" period an accumulation of oxygen demand builds up on the floor of the lagoon basin.

When the temperature rises this material starts to decompose; the initial decomposition generates sufficient gas to raise the material, part of which then leaves the lagoon not fully decomposed and pollutes the effluent.

Whatever the explanation I have found that maximum demand may be confined to a relatively short time in temperate continental climates. Of course, this invention is inapplicable for subtropical areas as there is no lessened activity due to "cold" conditions. Equally, in colder climates there may be no "summer" operation, even though temperatures reach 90°–100°F for a month or more; this is because there is no long warm period in which virtually complete bacteriological decomposition can be carried out without the formation of non-decomposed sludge.

This means that standby blower plant can be reduced to a minimum since of the total of 80 aerator guns, 20 percent are not fed for five-sixths of the year; and for half the year fully two-fifths of aerators are not used. These unused aerators are equivalent to unused blower plant capacity which can be switched in when it is desired to overhaul or perform maintenance tasks or if an operating blower unit should develop a fault.

The purpose of the layout will now probably be apparent. In winter, material that can be oxidized is decomposed by aeration supplied by the first four rows of guns. That which is not decomposed because of cold temperatures is deposited as a sludge as it flows slowly towards the outflow structures 84. These are connected by ducts 86 to the chlorination house 88 where the effluent quality is measured.

During the "winter," the decomposition that occurs does so over a comparatively small area and fairly quickly; and the remainder of the decomposable material (together with non-decomposables) is deposited as sludge mainly between the fourth and ninth rows of aerators 58, 78. I find the latter tends to act as a barrier tending to keep the sludge on the influent side and hence, I prefer to keep a few aerators going. The oxygen demand is high at the influent and its immediate surround but negligible elsewhere.

In "spring" not only is there a high oxygen demand at the inflow and a continuing demand over the whole area but also there is a very heavy demand adjacent the last row to the material accumulated during the "winter."

Not only is intensified aeration applied during the warm-up period but also mixing which accelerates the disturbance of the winter lodged material to make it available for oxidation in the warmer upper layers of the lagoon.

In "summer" the high oxygen demand is present at the inflow but there is a continuing requirement for an oxygen supply, although of course the intensity drops. The summer layout corresponds with some prior art installations, although most have uniform spacing.

Thus, it will be seen that the longitudinal profile of aeration intensity in "summer" operation gradually decreases from inflow to outflow, but the profile in "spring" operation decreases from inflow and then increases markedly to cope with the accumulated winter deposit.

I prefer to leave the basin between the ninth row 78 and the outflow 84 free so that non-decomposable sludge such as mineral matter, plastic fragment, woven fabric and the like may settle and will not be carried over by turbulence; also, of course, the treated sewage should preferably have some transit time between the last oxygenation and outflow to enable as thorough a decomposition as possible to take place during summer operation.

It will be understood by those skilled in the art that there are basically only two controls necessary for operating the lagoon basin aerators — that is, apart from those for changeover of blowers for maintenance or overhaul. The "winter" operation is normal and all "winter" rows or lines may be operated by an "on-off" valve in the main manifold instead of globe valves in the individual lines; but a temperature control may switch in the full aeration for "spring" operation when the lagoon liquid temperature has risen above 10°C. After a present time — enough to oxidize the "winters" accumulation — a time switch shuts off the excess capacity and "summer" operation continues until the temperature drops below 10° when the control closes all temperature controlled lines which are still open.

I claim:

1. A method of sewage treatment comprising:
   introducing raw sewage from an inlet at one end of a lagoon, passing said sewage through the lagoon in a flow path and removing the treated effluent at an outlet at the opposite end of said lagoon;
   treating said sewage in a first zone of high intensity aeration provided by a first densely disposed multiple of aerators located in rows across the flow path in said lagoon adjacent the inlet;
   further treating said sewage in a second zone of high intensity aeration provided by a second multiple of aerators located in rows across the flow path between said first multiple and said outlet, said second multiple of aerators being less densely disposed than said first multiple of aerators;
   subjecting said sewage to a third zone of high intensity aeration provided by a third multiple of aerators located in rows across the flow path between said second multiple of aerators and said outlet, said third multiple being more densely disposed than said second multiple of aerators;
   passing the treated sewage through a further zone between said third multiple of aerators and said outlet, said further zone being devoid of aerators;
   supplying air to said aerators by conduits connected to each row of aerators; and
   maintaining a normally gradually decreasing aeration intensity in the sewage being treated downstream from the first multiple of aerators by maintaining the air supply to said first and second multiples of aerators and controlling the air supply to said third multiple of aerators, said third multiple of aerators being capable of providing a zone of final high intensity aeration in the sewage being treated, said third multiple of aerators including a temperature control switch connected to means which close the conduits to said third multiple of aerators when the temperature in said lagoon falls below about 10°C and which open said conduits when the temperature in said lagoon rises above about 10°C.

2. The method of claim 1 wherein certain of said conduits to said third multiple of aerators are closed by closure means actuated by a timing means, said closure means being activated by said timing means at a preset time measured from the time at which the lagoon temperature rises above about 10°C.

* * * * *